(12) United States Patent
Chan et al.

(10) Patent No.: US 11,163,518 B1
(45) Date of Patent: Nov. 2, 2021

(54) DOCKING STATION

(71) Applicant: GOOD WAY TECHNOLOGY CO., LTD., New Taipei (TW)

(72) Inventors: Chien-Chih Chan, New Taipei (TW); Chang-Chieh Yang, New Taipei (TW); Chung-Nan Ko, New Taipei (TW); Liang-Hung Yu, New Taipei (TW)

(73) Assignee: GOOD WAY TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/996,113

(22) Filed: Aug. 18, 2020

(51) Int. Cl.
  *G06F 3/14* (2006.01)
  *G06F 13/40* (2006.01)
  *G06F 1/16* (2006.01)

(52) U.S. Cl.
  CPC .......... *G06F 3/1454* (2013.01); *G06F 1/1632* (2013.01); *G06F 3/1423* (2013.01); *G06F 13/4022* (2013.01)

(58) Field of Classification Search
  CPC ...... G06F 1/1626; G06F 1/1632; G06F 1/203; G06F 13/4068; G06F 13/4221; G06F 3/023; G06F 3/14; G06F 3/1423; G06F 3/1446; G09G 2340/12; G09G 2370/20; G09G 2370/24; G09G 5/006; H04N 2201/0058

See application file for complete search history.

(56) References Cited

U.S. PATENT DOCUMENTS

| | | | |
|---|---|---|---|
| 9,639,491 B2* | 5/2017 | Chang | G06F 13/4022 |
| 2014/0282103 A1* | 9/2014 | Crandall | G06F 3/0488 |
| | | | 715/753 |
| 2015/0356045 A1* | 12/2015 | Soffer | G06F 1/1632 |
| | | | 710/303 |

* cited by examiner

*Primary Examiner* — Nelson M Rosario
(74) *Attorney, Agent, or Firm* — Li & Cai Intellectual Property (USA) Office

(57) ABSTRACT

A docking station is provided. When a first electronic device is connected to a docking station, the first electronic device is connected to a first display device and a second display device through the docking station. However, when the first electronic device and a second electronic device are connected to the docking station, the docking station connects the first display device to the first electronic device, and connects the second display device to the second electronic device instead of the first electronic device.

6 Claims, 3 Drawing Sheets

DOCKING STATION

FIELD OF THE DISCLOSURE

The present disclosure relates to a docking station, and more particularly to a docking station for automatically sharing a screen on which information of an electronic device of a new user can be displayed to share the information with other users.

BACKGROUND OF THE DISCLOSURE

Participants of a video conference often use screens to share and exchange messages with each other. A conventional conference system generally electronically connects the screens to one electronic device such as a computer of the participants by a wire. Then, the screens play a video from the one electronic device such that the participants can share the messages with each other. However, when a new participant joins the video conference and also intends to share a message, the conventional conference system cannot automatically share one of the screens to another electronic device such as a cell phone of the new participant. As a result, the new participant cannot share the message with the other participants in the video conference.

SUMMARY OF THE DISCLOSURE

In response to the above-referenced technical inadequacies, the present disclosure provides a docking station. The docking station includes a video multi-output component and the video switching component. When a first electronic device and a first display device are connected to the video multi-output component, the video multi-output component connects the first electronic device to the first display device and the first display device displays information of the first electronic device. The video switching component is connected to the video multi-output component. When the first electronic device and the first display device are connected to the video multi-output component and a second display device is connected to the video switching component, the first electronic device is connected to the video switching component through the video multi-output component, the video switching component connects the first electronic device to the second display device, and the second display device displays the information of the first electronic device. When the first electronic device, a second electronic device and the first display device are connected to the video multi-output component and the second display device is connected to the video switching component, the video switching component connects the second display device to the second electronic device instead of the first electronic device, and the second display device displays information of the second electronic device.

In certain embodiments, the docking station has a first expansion slot. Two terminals of a first connection wire are respectively inserted into the first expansion slot and a connection port of the first electronic device, such that the first electronic device is connected to the video multi-output component through the first connection wire.

In certain embodiments, the docking station has a second expansion slot. Two terminals of a second connection wire are respectively inserted into the second expansion slot and a connection port of the first display device, such that the first display device is connected to the video multi-output component through the second connection wire.

In certain embodiments, the docking station has a third expansion slot. Two terminals of a third connection wire are respectively inserted into the third expansion slot and a connection port of the second display device, such that the second display device is connected to the video switching component through the third connection wire.

In certain embodiments, the docking station has a fourth expansion slot. Two terminals of a fourth connection wire are respectively inserted into the fourth expansion slot and a connection port of the second electronic device, such that the second electronic device is connected to the video switching component through the fourth connection wire.

In certain embodiments, the docking station further includes a wireless video output component. The wireless video output component is wirelessly connected to the second electronic device and connected to the video switching component. The second electronic device is connected to the video switching component through the wireless video output component.

As described above, the present disclosure provides the docking station. When only one user intends to share information of one electronic device, the docking station connects the one electronic device to the plurality of display devices and allows the information of the one electronic device to be displayed on the plurality of display devices. Further, when another user also intends to share information of another electronic device, the docking station allows one of the display devices to display the information of the another electronic device. As a result, the display devices respectively display different information of the electronic devices, such that the users can share and discuss the different information with each other and work together.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
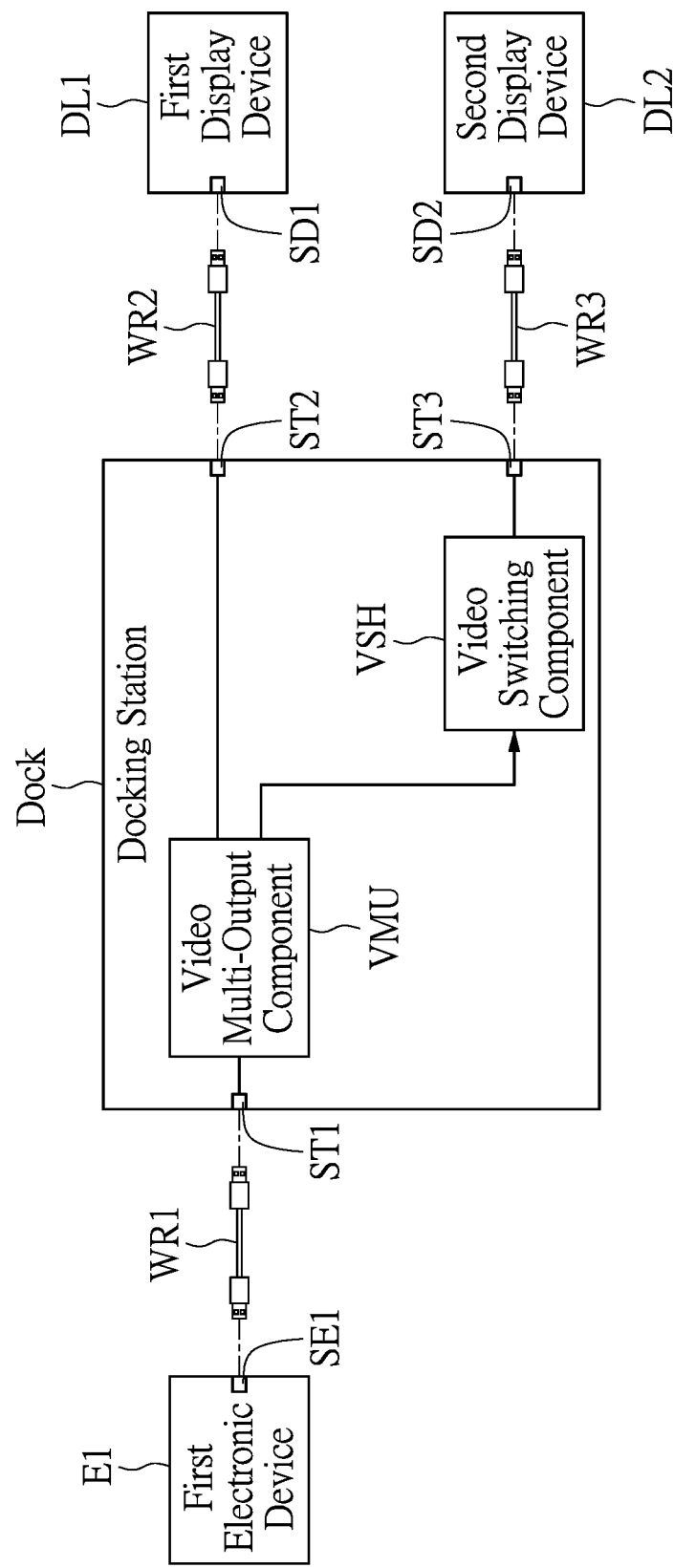
FIG. 1 is a schematic configuration diagram of a docking station, a first electronic device, a first display device and a second display device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a schematic configuration diagram of a docking station, a first electronic device, a first display device and a second display device according to an embodiment of the present disclosure.

In the embodiment, the docking station Dock is applicable for connecting a plurality of electronic devices to a plurality of display devices. For convenience of description, two electronic devices such as a first electronic device E1 and a second electronic device E2 as shown in FIG. 1 are exemplified in the embodiment. In addition, two display devices such as a first display device DL1 and a second display device DL2 as shown in FIG. 1 are exemplified in the embodiment. It should be understood that the present disclosure does not limit the number of electronic devices and the number of display devices, which are only exemplified in the embodiment, and can be adjusted according to actual requirements.

As shown in FIG. 1, the docking station Dock may include a video multi-output component VMU and a video switching component VSH. For example, the video multi-output component VMU may have one input terminal and a plurality of output terminals. A first output terminal of the video multi-output component VMU may be connected to the first display device DL1. A second output terminal of the video multi-output component VMU may be connected to the video switching component VSH.

For example, in the embodiment, the first electronic device E1 may be connected to the docking station Dock through a wire, but the present disclosure is not limited thereto. In practice, the first electronic device E1 may be wirelessly connected to the docking station Dock according to actual requirement. The docking station Dock connects the first electronic device E1 to the display devices.

For example, the first electronic device E1 described herein may be a computer, a laptop, a mobile phone, a tablet or other types of electronic devices, and a connection port SE1 of the first electronic device E1 may be a USB connection port, a USB-C connection port, a Thunderbolt 3 connection port or other types of connection ports, but the present disclosure is not limited thereto.

In detail, the docking station Dock of the embodiment may have a first expansion slot ST1. One terminal of a first connection wire WR1 is inserted into the first expansion slot ST1 of the docking station Dock. The other terminal of the first connection wire WR1 is inserted into the connection port SE1 of the first electronic device E1. As a result, the first electronic device EL is connected to the video multi-output component VMU of the docking station Dock through the first connection wire WR1.

The docking station Dock may further have a second expansion slot ST2. One terminal of a second connection wire WR2 is inserted into the second expansion slot ST2. The other terminal of the second connection wire WR2 is inserted into a connection port SD1 of the first display device DL1. As a result, the first display device DL1 is connected to the video multi-output component VMU of the docking station Dock through the second connection wire WR2. It should be understood that, the present disclosure is not limited to the above-mentioned wired connected manner. In practice, the first display device DL1 may be wirelessly connected to the docking station Dock according to actual requirement.

In addition, the docking station Dock may further have a third expansion slot ST3. One terminal of a third connection wire WR3 is inserted into the third expansion slot ST3. The other terminal of the third connection wire WR3 is inserted into a connection port SD2 of the second display device DL2. As a result, the second display device DL2 is connected to the video switching component VSH of the docking station Dock through the third connection wire WR3. The second display device DL2 and the first display device DL1 may be the same or different types of display devices. It should be understood that, the present disclosure is not limited to the above-mentioned wired connected manner. In practice, the second display device DL2 may be wirelessly connected to the docking station Dock according to actual requirement.

When the first electronic device E1 and the first display device DL1 are connected to the video multi-output component VMU of the docking station Dock and the second display device DL2 is connected to the video switching component VSH of the docking station Dock, the first electronic device E1 may be connected to the first display device DL1 through the video multi-output component VMU and connected to the video switching component VSH through the video multi-output component VMU, such that the first electronic device E1 may be connected to the second display device DL2 through the video switching component VSH.

As a result, a screen image of the first electronic device E1 of a user can be displayed on the first display device DL1 and the second display device DL, thereby sharing information with other users. The screen image may include an image of performing an operation on the first electronic device E1 by a user, and an image of information of a document file that is opened on a desktop of the first electronic device by performing the operation. It should be understood that, the second display device DL2 and the first display device DL1 may simultaneously display the same or different information.

That is, when only one electronic device (such as the first electronic device E1 shown in FIG. 1) and a plurality of display devices (such as the first display device DL1 and the second display device DL2 as shown in FIG. 1) are connected to the docking station Dock, the plurality of display devices can simultaneously display information shared by the one electronic device.

Figure 2:
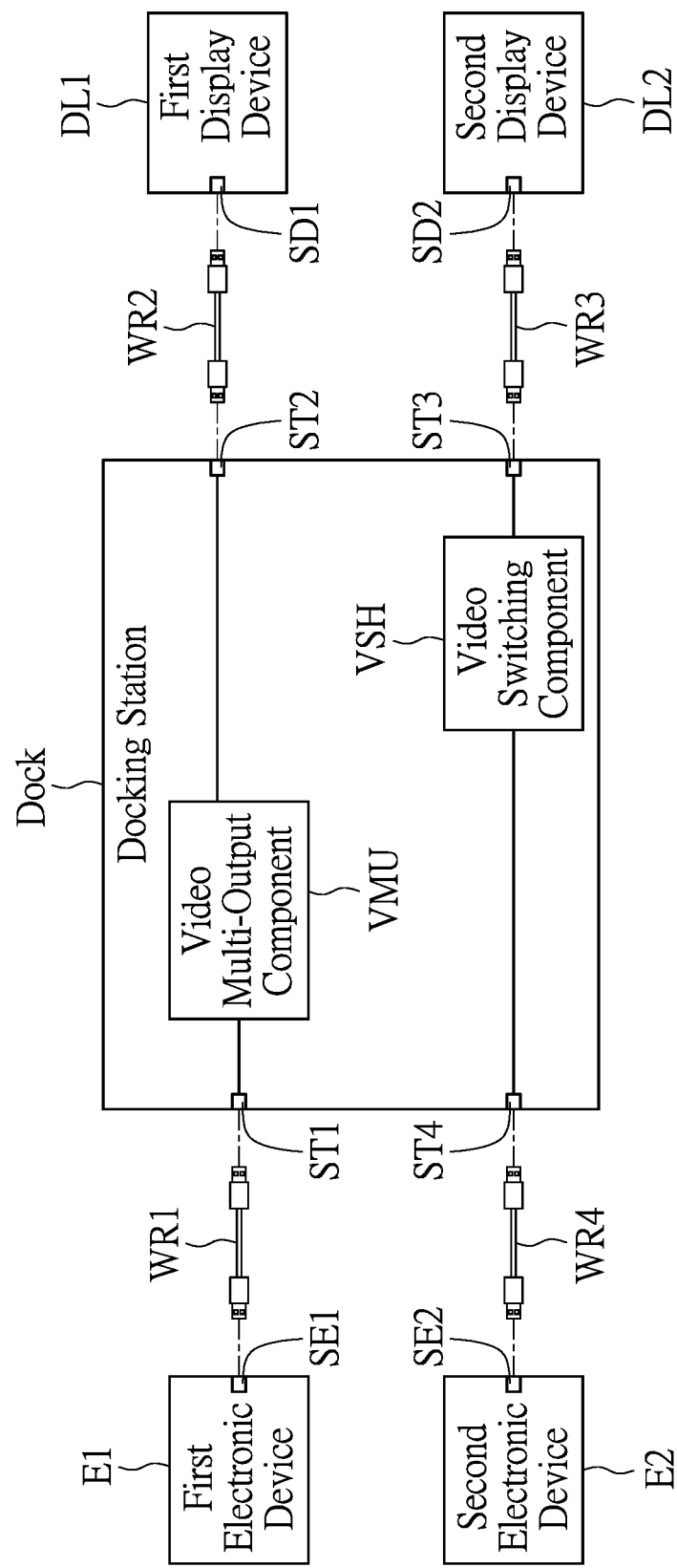
FIG. 2 is a schematic configuration diagram of the docking station connected to the first electronic device and a second electronic device through a wire according to the embodiment of the present disclosure.

Reference is made to FIGS. 1 and 2, wherein FIG. 1 is a schematic configuration diagram of a docking station, a first electronic device, a first display device and a second display device according to an embodiment of the present disclosure, and FIG. 2 is a schematic configuration diagram of the docking station connected to the first electronic device and a second electronic device through a wire according to the embodiment of the present disclosure. The same descriptions of FIGS. 1 and 2 are not repeated here.

As shown in FIG. 2, the docking station Dock may have a fourth expansion slot ST4. One terminal of a fourth connection wire WR4 is inserted into the fourth expansion slot ST4. The other terminal of the fourth connection wire WR4 is inserted into a connection port SE2 of the second electronic device E2. As a result, the second electronic device E2 is connected to the video switching component VSH of the docking station Dock through the fourth connection wire WR4.

For example, the second electronic device E2 described herein may be a computer, a laptop, a mobile phone, a tablet or other types of electronic devices, and the connection port SE2 of the second electronic device E2 may be a USB connection port, a USB-C connection port, a Thunnderbolt3 connection port or other types of connection ports, but the present disclosure is not limited thereto.

When the first electronic device E1 and the first display device DL1 are connected to the video multi-output component VMU of the docking station Dock, and the second electronic device E2 and the second display device DL2 are connected to the video switching device VSH of the docking station Dock, the video switching component VSH connects the second display device DL2 to the second electronic device E2 as shown in FIG. 2, instead of the first electronic device E1 as shown in FIG. 1. Under this condition, the second display device DL2 displays information of the second electronic device E2 instead of the information of the first electronic device E1.

In detail, the first expansion slot ST1 of the docking station Dock may be defined as a primary slot, and the fourth expansion slot ST4 of the docking station Dock may be defined as a secondary slot. The docking station Dock determines which one of the slots is inserted by a connection wire used by the electronic device, and accordingly allows the electronic device to use which one or more of the display devices.

For example, as shown in FIG. 1, the first electronic device E1 is connected to the docking station Dock through the first connection wire WR1 and the first connection wire WR1 is inserted into the primary slot. Under this condition, the first electronic device E1 can use the first display device DL1 and the second display device DL2 to share information.

In practice, if only one electronic device such as the electronic device E2 is connected to the docking station Dock through a connection wire and the connection wire is inserted into the secondary slot, the electronic device E2 may only be allowed to use the second display device DL2 or may be allowed to use the first display device DL1 and the second display device DL2.

The plurality of electronic devices such as the first electronic device E1 and the second electronic device E2 as shown in FIG. 2 may be connected to the docking station Dock at the same time. The first electronic device E1 is connected to the docking station Dock through the first connection wire WR1 and the first connection wire WR1 is inserted into the primary slot. The second electronic device E2 is connected to the docking station Dock through the second connection wire WR2 and the second connection wire WR2 is inserted into the secondary slot. Under this condition, the first display device DL1 may be used as a primary screen by the first electronic device E1, and the second display device DL2 may be used as a secondary screen by the second electronic device E2.

As described above, a difference between FIGS. 1 and 2 is that, only one electronic device such as the first electronic device E1 is connected to the docking station Dock as shown in FIG. 1. Therefore, the plurality of display devices such as the first display device DL1 and the second display device DL2 only display information of the one electronic device.

In contrast, as shown in FIG. 2, the plurality of electronic devices such as the first electronic device E1 and the second electronic device E2 are connected to the docking station Dock. Under this condition, the docking station Dock of the embodiment allows other users to use the second display device DL2. That is, the first display device DL1 is used by the first electronic device E1 and the second display device DL2 is used by the second electronic device E2. The plurality of display devices can respectively display different presentations and documents of the plurality of electronic devices such that the users can read and discuss different information at the same time, and work together.

Figure 3:
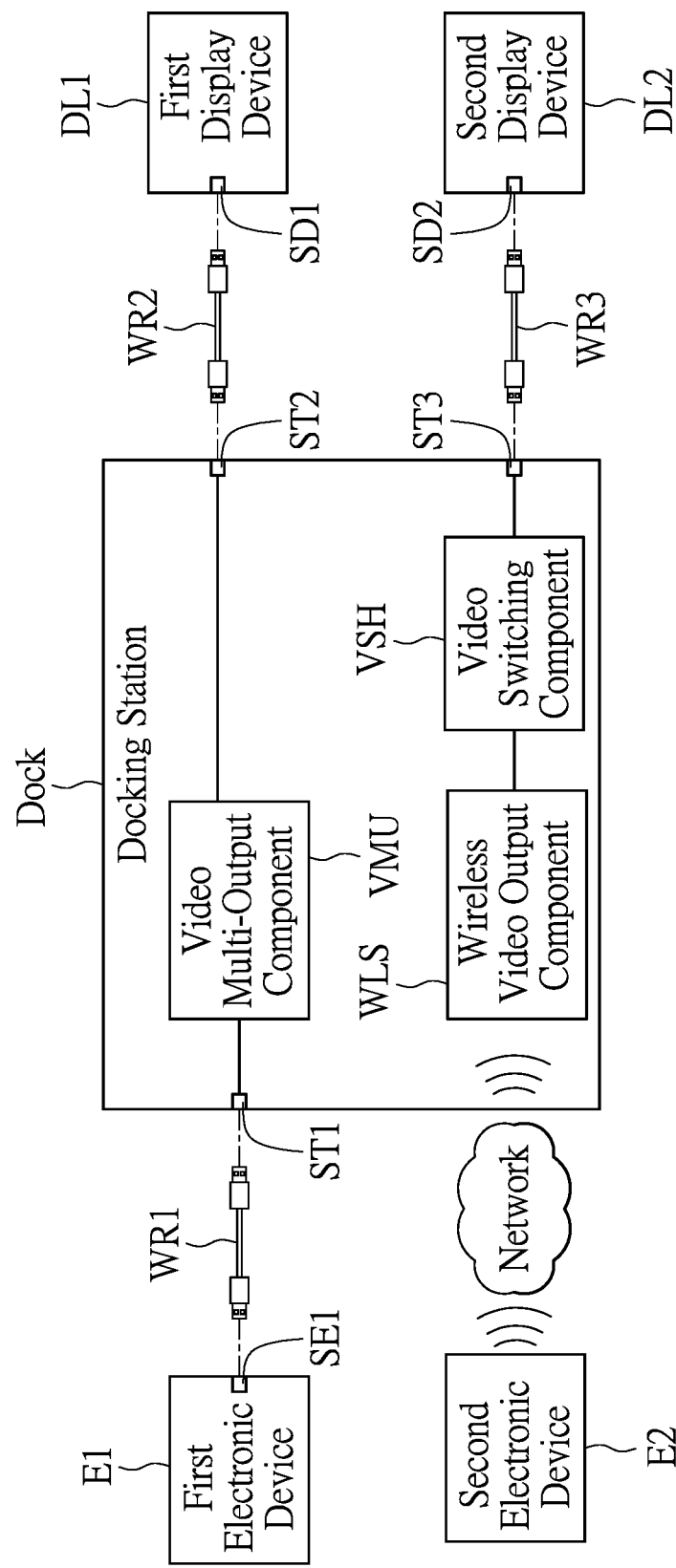
FIG. 3 is a schematic configuration diagram of the docking station connected to the first electronic device through a wire and being wirelessly connected to the second electronic device according to the embodiment of the present disclosure.

Reference is made to FIGS. 1 and 3, wherein FIG. 1 is a schematic configuration diagram of a docking station, a first electronic device, a first display device and a second display device according to an embodiment of the present disclosure, and FIG. 3 is a schematic configuration diagram of the docking station connected to the first electronic device through a wire and being wirelessly connected to the second electronic device according to the embodiment of the present disclosure. The same descriptions of FIGS. 2 and 3 are not repeated here.

A difference between FIGS. 2 and 3 is that, the second electronic device E2 is connected to the docking station Dock through the fourth connection wire WR4 as shown in FIG. 2, but the second electronic device E2 is wirelessly connected to the docking station Dock as shown in FIG. 3.

As shown in FIG. 3, the docking station Dock of the embodiment further includes a wireless video output component WLS. For example, the wireless video output component WLS may use Miracast, Wi-Fi, WiGig, or other wireless audio technologies, but the present disclosure is not limited thereto.

The wireless video output component WLS of the docking station Dock is connected to the video switching component VSH of the docking station Dock. When the second electronic device E2 is wirelessly connected to the wireless video output component WLS of the docking station Dock through a network, the second electronic device E2 is connected to the video switching component VSH through the wireless video output component WLS of the docking station Dock, and the second electronic device E2 is connected to the second display device DL2 through the video switching component VSH.

In brief, the second electronic device E2 of a user is wirelessly connected to the second display device DL2 through the docking station Dock and transmits information to the second display device DL2 for displaying the information, thereby sharing the information with other users.

In summary, the present disclosure provides the docking station. When only one user intends to share information of one electronic device, the docking station connects the one electronic device to the plurality of display devices and allows the information of the one electronic device to be displayed on the plurality of display devices. Further, when another user also intends to share information of another electronic device, the docking station allows one of the display devices to display the information of the another electronic device. As a result, the display devices respectively display different information of the electronic devices, such that the users can share and discuss the different information with each other and work together.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A docking station, comprising:
    a video multi-output component, wherein when a first electronic device and a first display device are connected to the video multi-output component, the video multi-output component connects the first electronic device to the first display device and the first display device displays information of the first electronic device; and
    a video switching component connected to the video multi-output component;
    when the first electronic device and the first display device are connected to the video multi-output component and a second display device is connected to the video switching component, the first electronic device is connected to the video switching component through the video multi-output component, the video switching component connects the first electronic device to the second display device, and the second display device displays the information of the first electronic device;
    wherein when the first electronic device, a second electronic device and the first display device are connected to the video multi-output component and the second display device is connected to the video switching component, the video switching component connects the second display device to the second electronic device instead of the first electronic device, and the second display device displays information of the second electronic device;
    wherein the docking station has a plurality of expansion slots, first terminals of a plurality of connection wires are respectively inserted into the plurality of expansion slots, second terminals of the plurality of connection wires are respectively inserted into connection ports of the first electronic device, the first display device, the second electronic device and the second display device.

2. The docking station according to claim 1, wherein one of the plurality of expansion slots is a first expansion slot, one of the plurality of connection wires is a first connection wire, two terminals of the first connection wire are respectively inserted into the first expansion slot and the connection port of the first electronic device, such that the first electronic device is connected to the video multi-output component through the first connection wire.

3. The docking station according to claim 2, wherein one of the plurality of expansion slots is a second expansion slot, one of the plurality of connection wire is a second connection wire, two terminals of the second connection wire are respectively inserted into the second expansion slot and the connection port of the first display device, such that the first display device is connected to the video multi-output component through the second connection wire.

4. The docking station according to claim 3, wherein one of the plurality of expansion slots is a third expansion slot, one of the plurality of connection wires is a third connection wire, two terminals of the third connection wire are respectively inserted into the third expansion slot and the connection port of the second display device, such that the second display device is connected to the video switching component through the third connection wire.

5. The docking station according to claim 4, wherein one of the plurality of expansion slots is a fourth expansion slot, one of the plurality of connection wires is a fourth connection wire, two terminals of the fourth connection wire are respectively inserted into the fourth expansion slot and the connection port of the second electronic device, such that the second electronic device is connected to the video switching component through the fourth connection wire.

6. The docking station according to claim 4, further comprising:
    a wireless video output component wirelessly connected to the second electronic device and connected to the video switching component;
    wherein the second electronic device is connected to the video switching component through the wireless video output component.

* * * * *